United States Patent [19]

Sleegers et al.

[11] Patent Number: 4,899,329
[45] Date of Patent: * Feb. 6, 1990

[54] OPTICALLY READABLE DISC WITH A CENTERING MEMBER FIXED TO A TRANSPARENT SUBSTRATE

[75] Inventors: Franciscus T. Sleegers; Pieter D. Schuitmaker; Peter J. M. Janssen, all of Eindhoven, Netherlands

[73] Assignee: U.S. Philips Corporation, New York, N.Y.

[*] Notice: The portion of the term of this patent subsequent to Apr. 9, 2002 has been disclaimed.

[21] Appl. No.: 490,801

[22] Filed: May 2, 1983

[30] Foreign Application Priority Data

Feb. 9, 1983 [NL] Netherlands .................... 8300479

[51] Int. Cl.⁴ .................. G11B 7/24; G11B 23/14
[52] U.S. Cl. .................... 369/275; 369/282; 369/271; 369/290
[58] Field of Search .......... 369/275, 270, 271, 282, 369/44, 111, 93, 289, 290; 346/135.1, 137; 360/102; 358/342

[56] References Cited

U.S. PATENT DOCUMENTS

| | | | |
|---|---|---|---|
| 3,430,966 | 3/1969 | Gregg | 346/137 X |
| 4,308,545 | 12/1981 | Lehureau et al. | 346/137 X |
| 4,365,258 | 12/1982 | Geyer et al. | 358/342 X |
| 4,379,507 | 4/1983 | Llabres | 346/137 X |
| 4,477,894 | 10/1984 | Clurman | 369/270 |
| 4,510,508 | 4/1985 | Janssen | 369/275 X |

FOREIGN PATENT DOCUMENTS 2072924 10/1981 United Kingdom .................. 369/44

OTHER PUBLICATIONS

Bounhuis et al, "Video Disk Player Optics", Applied Optics, vol. 17, No. 13, 7/78.
Bulthius et al, "Ten Billion Bits on a Disk", IEEE Spectrum, 8/79.
Bartolini et al, "Optical Disk Systems Emerae", IEEE Spectrum, 8/78.
Velzel, "Lazer Beam Reading of Video Records", Applied Optics, vol. 17, No. 13, 7/78.

Primary Examiner—Aristotelis M. Psitos
Assistant Examiner—Robert A. Weinhardt
Attorney, Agent, or Firm—William L. Botjer

[57] ABSTRACT

A transparent substrate has an information layer on an entirely flat side, and a centering member on the other side adapted to cooperate with a centering device of an apparatus for inscribing and/or reading the disc. The centering member may be glued in place and have an aperture for engagement by an apparatus spindle.

3 Claims, 1 Drawing Sheet

U.S. Patent
Feb. 6, 1990
4,899,329
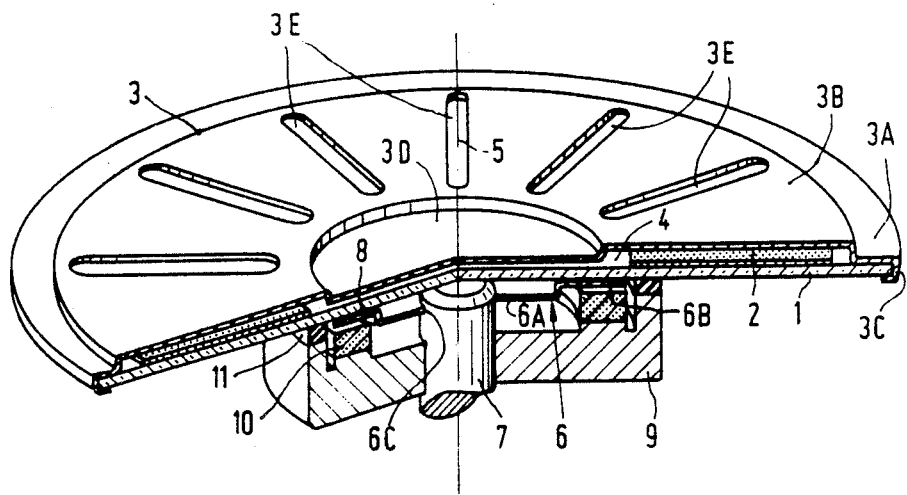

OPTICALLY READABLE DISC WITH A CENTERING MEMBER FIXED TO A TRANSPARENT SUBSTRATE

BACKGROUND OF THE INVENTION

The invention relates to an optically readable disc comprising a round transparent substrate to be driven about a central axis of rotation, and an information layer.

Such discs are known in various types and versions. For example, British Patent Specification No. 1,446,009 (herewith incorporated by reference) describes optically readable video discs comprising a transparent substrate which is provided with a structure on one side which can be read through the substrate by means of a laser beam, and which is coated with a reflecting vacuum-deposited metal layer coated with a protective layer of lacquer. Frequently, two such discs are glued to each other back-to-back, yielding a double disc which is optically readable on both sides. For centering and positioning the video disc on a video-disc player, the disc is provided with a central aperture which cooperates with a centering member arranged on a drive spindle in the video-disc player. Optically readable audio discs generally have small dimensions and a differently coded information structure, but they are otherwise in principle identical to these known video discs.

Another type of optically readable disc is known from U.S. Pat. No. 4,074,282 (herewith incorporated by reference). These known discs comprise one or more transparent substrates—sometimes in combination with a non-transparent disc—which are glued to each other by means of coaxial annular spacers. By means of the annular spacers at least one gas-tight space is formed between the various parts of the disc. This type of optically readable disc is intended as a storage disc. By means of a laser beam a recording layer adjoining a sealed space can be provided with information through a transparent substrate. The recording layer comprises, for example, a thin layer of a tellurium alloy formed on the substrate by vacuum deposition.

Still other known optically readable discs are used as an intermediate product in the manufacture of optically readable video discs and audio discs. These otpically readable discs, generally referred to as "masters", comprise a glass substrate on which a photosensitive layer is deposited on one side. In a highly dust-free and very well ventilated room the video information and/or audio information is inscribed in the recording layer by means of a laser beam using special precision equipment. After the information has been recorded the photosensitive layer is developed. The photosensitive layer then contains a pattern of pits which can be duplicated by means of duplicating techniques of the type as described in for example U.S. Pat. No. 4,312,823 (herewith incorporated by reference). The masters are provided with a central aperture for accurate centering on the drive spindle of the machine used for recording the information.

The optical storage discs as generally used until now comprise two glass substrates which are glued to each other with interposed concentric annular spacers. However, when depositing the tellurium layer on these glass substrates and when depositing the photosensitive layer on the glass substrates of masters some problems occur. These problems are mainly associated with the method of depositing these layers on the substrates. By way of example a brief description will be given of the method used for depositing the photosensitive layer on the masters and the further processing of the exposed disc.

A ground glass substrate is employed whose surface, which is to be provided with the photosensitive layer, is first thoroughly cleaned and washed with demineralized water. These operations and all further operations to which the masters are subjected must be carried out in a conditioned highly dust-free room. For cleaning and washing the substrate is placed on a rotating spindle which projects through the central hole. The disc is dried by rotating it with a higher speed, so that the water particles are spun off the surface. The next steps in the method are also effected with a rotating disc, repeated drying being effected by rotation with a higher speed. After having been washed and dried the substrate is degreased by means of a suitable liquid, after which an adhesive liquid is applied to the disc. Then degreasing is repeated and finally the photoresist layer is applied. The photoresist layer is distributed evenly over the surface by fast rotation of the disc. After the exposure of the photo-resist layer on the described above, special machine developing takes place, again with the disc rotating, after which in a final operation the surface is rinsed again and subsequently a silver layer is applied by vacuum deposition. It has been found that it is difficult to prevent residual liquids used in previous steps of the method from settling in the central aperture of the disc. This may cause contamination of the product and consequent rejection of the product. Without describing the entire method of manufacturing optical storage discs it will be evident from the foregoing that, since the substrates of such discs also come several times in contact with liquids, similar problems will occur during manufacture.

Even with video discs and audio discs the central disc hole may give rise to problems. As already stated, the discs are provided with an extremely thin metal layer, in general vacuum-deposited silver, which is covered with a lacquer coating of 5 to 10 microns thickness. The silver layer must be coated very thoroughly because in the long run it may be affected by sulphur from the atmosphere, thereby rendering the disc unserviceable. The lacquer coating extends from the circumference of the disc to the central hole. At these locations there is an increased risk of the silver layer being attacked. Near the center hole this risk even increases because the disc is clamped in position near the central hole, so that at this location forces are exerted on the disc which may give rise to shear stresses between the lacquer coating and the silver layer.

SUMMARY OF THE INVENTION

It is the object of the invention to provide optically readable discs of the type mentioned in the opening paragraph which do not present the aforementioned problems.

According to the invention the substrate comprises a disc without aperture. The disc is flat at least on the side where the information layer is located, the substrate carries an axially projecting central centering member on the other side for cooperation with centering means of an apparatus for incscribing and/or reading optically readable discs.

All the aforementioned problems which evolve from the presence of the center hole are solved by the invention. However, depending on the embodiment, the invention also has some further advantages. When injection molding-plastic audio and video discs a moving part in the injection-molding machine for the formation of the center hole may be dispensed with. Alternatively the plastic disc may be provided with an integrally molded plastic central centering member. This is also expected to have the advantage of reducing stresses in and consequent deformations of the disc.

An advantageous embodiment of the invention is characterized in that the centering member at least partly comprises a ferromagnetic material. In this respect it is advantageous, in particular when the substrate is made of glass but also in other cases, if the entire centering member is made of a ferromagnetic material and is connected to the substrate by a layer of glue. The advantage of these embodiments is that the disc can be clamped magnetically on a drive spindle. It is then no longer necessary to urge the disc in position from the other side or to clamp it in position by other mechanical means. Moreover, in the manufacture of the masters this yields the additional advantage that the aforementioned method can be automated, the rotating spindles used in the various stage of manufacture being provided with an electrically controlled electromagnetic clutch which releases or attracts the centering member, as desired. As a result of this the substrate can be transferred automatically from one spindle to another by mechanical means, so that it need not be handled by an operator. This leads not only to an increase of the productivity but also to a cleaner process, resulting in a further reduction of the percentage of rejects.

If the centering member comprises a separate component which is affixed to the disc, optical means may be used for the accurate alignment of the centering member relative to the tracks recorded on the disc or relative to the outer circumference of the disc.

An advantageous embodiment, which is particularly suitable for consumer products such as small storage discs, is characterized in that the centering member comprises a part which is made of a sheet material and which has a flat round bottom which adjoins a flat flange-shaped rim, and the flange-shaped rim is connected to the substrate by the layer of glue. Such a centering member can be manufactured simply and cheaply and is found to perform satisfactorily in practice. The apparatus on which the disc is used may be provided with a drive spindle having permanent-magnetic means which cooperate with the sheet-steel centering member. For accurately and simply centering the disc on a drive spindle it is advantageous to use another embodiment, which is characterized in that the bottom of the centering member is formed with a central centering aperture for the passage, with a slight clearance, of a centering means of an apparatus for inscribing and/or reading optically readable discs. In the sheet steel component a central aperture can be formed with high precision and with a smaller tolerance on its diameter. Moreover, a central aperture is very suitable for glueing the centering member to the substrate at the correct location with the aid of optical means.

The invention will now be described in more detail, by way of example with reference to the drawing.

BRIEF DESCRIPTION OF THE DRAWING

The sole FIGURE is a perspective view of an optically readable storage disc in accordance with the invention, a part of the storage dis and some parts of an apparatus for driving the storage disc being cut away.

DESCRIPTION OF THE PREFERRED EMBODIMENT

The storage disc comprises a transparent glass or plastic substrate 1. A reflecting recording layer 2, which can be modified locally by means of a radiation beam, is deposited on the substrate. In the present embodiment this recording layer is present only at the substrate area which is actually intended for recording. However, it is alternatively possible to deposit the recording layer over a larger part of the substrate, for example over the entire substrate area. Information is recorded and read through the transparent substrate by means of a laser beam, not shown. A cover disc 3 is fixed to the substrate in a substantially gas-tight manner at some distance from the recording layer 2, so that a sealed space 4 is enclosed between the substrate and the cover disc. The cover disc is substantially thinner than the substrate and has a substantially smaller resistance to such deformations as may be caused by differences between the gas pressure in the sealed space 4 and the barometric pressure.

The cover disc is made of thin metal sheet, for example aluminum sheet, which is formed into a shallow tray comprising first parts 3A in the form of an annular flange disposed in a first plane for fixing to the substrate. Second parts 3B constituting the bottom of the shallow tray and covering the sealed space 4 are disposed in a second plane parallel to the plane in which the flange 3A is disposed. Adjacent the flange 3A third parts are present in the form of a turned-over rim 3C comprising the edge of the substrate. These third parts have been spun or rolled around the edge of the substrate. The substrate 1 comprises a perfectly flat round disc and is not formed with a central aperture for centering and fixing the disc on a drive means.

The cover disc is only connected to the substrate at the location of the circumference. The cover disc comprises fourth parts 3D in the form of a round embossment whose bottom is disposed in a plan between the aforementioned two planes and above a part of the substrate which is not used for recording. This part is therefore situated at some distance from the substrate but is situated closer to the substrate than the part 3B. In case of depression of the cover disc this part, inter alia because it is the most central part, will first come in contact with the substrate in an area where this has no undesired consequences. In this respect it is important, especially if the metal sheet used is thin, that the cover disc is provided with radial reinforcements 3E obtained by local deformation. These ensure that the part 3B has the required rigidity.

The storage disc can be rotated about a central axis of rotation 5. On the side facing away from the recording layer 2 the substrate carries a central centering member 6 which projects in the axial direction. This member is adapted to cooperate with centering means in the form of a spindle 7 of an apparatus, not shown, for inscribing and/or reading optically readable storage discs. A suitable apparatus, apart from the centering means which have a slightly different shape and which are intended for discs having a central aperture, is described in U.S. Pat. No. 4,545,046 (herewith incorporated by reference). The entire centering member 6 is made of sheet steel and is connected to the substrate by a layer of glue 8. It has a flat round bottom 6A and a flat flange-like rim 6B which is connected to the substrate by the layer of glue 8. The bottom 6A of the centering member 6 is formed with a central centering aperture 6C through which the spindle 7 extends with a slight clearance. This spindle may be the motor spindle of a drive motor, allowing a very simple, yet sufficiently accurate, centering of the storage disc on the drive means.

The spindle 7 carries a turntable 9 which supports the substrate 1. The turntable carries an annular permanent magnet 10 which draws the sheet steel centering means 6 axially onto the turntable 9. Moreover, the turntable is provided with a ring 11 of a suitable elastic material which is subject to a slight elastic deformation as a result of the force of attraction of the permanent magnet. In the present embodiment the ring 11 cooperates directly with the substrate 1. Alternatively, the flange 6B of the centering means 6 may be given a larger diameter, so that the ring 6 does not cooperate directly with the substrate 1 but with the flange 6B. The free end of the motor spindle 7 bears against the underside of the substrate 1 and thereby constitutes a stop which defines the axial position of the information disc on the turntable 9.

The invention is not limited to the embodiment shown but many different embodiments are possible within the scope of the invention as defined in the claims. For example, a centering member may be used which comprises a plurality of parts, which may be made of different materials. A part of the centering member may then be integral with the substrate.

What is claimed is:

1. An optically readable disc adapted to be driven about a central axis of rotation, comprising a round transparent substrate and an information layer disposed to one side of the substrate, characterized in that the substrate comprises a substantially rigid disc without aperture, said disc being flat at least on the side where the information layer is disposed, and an axially projecting central centering member of ferromagnetic material disposed on the other side of the substrate and joined thereto by a layer of glue, said centering member cooperating with centering means of an apparatus for inscribing and/or reading optically readable discs.

2. An optically readable disc adapted to be driven about a central axis of rotation, comprising a round transparent substrate and an information layer deposited on one side of the substrate, characterized in that the substrate comprises a substantially rigid disc without aperture, said disc being flat at least on the side where the information layer is deposited, and an axially projecting central centering member made entirely of a ferromagnetic material, disposed on the other side of the substrate, for cooperating with centering means of an apparatus for inscribing and/or reading optically readable discs, and comprising a part made of a sheet material, having a flat round bottom and a flat flange-shaped rim adjoining said bottom, said rim being connected to the substrate by a layer of glue.

3. An optically readable disc as claimed in claim 2, characterized in that the bottom (6A) of the centering member (6) is formed with a central centering aperture (6C) for the passage, with slight clearance, of a centering means (7) of an apparatus for inscribing and/or reading optically readable discs.

* * * * *